M. HOLCZER.
TRACTOR HITCH.
APPLICATION FILED SEPT. 15, 1919.
1,327,617.
Patented Jan. 13, 1920.
3 SHEETS—SHEET 2.
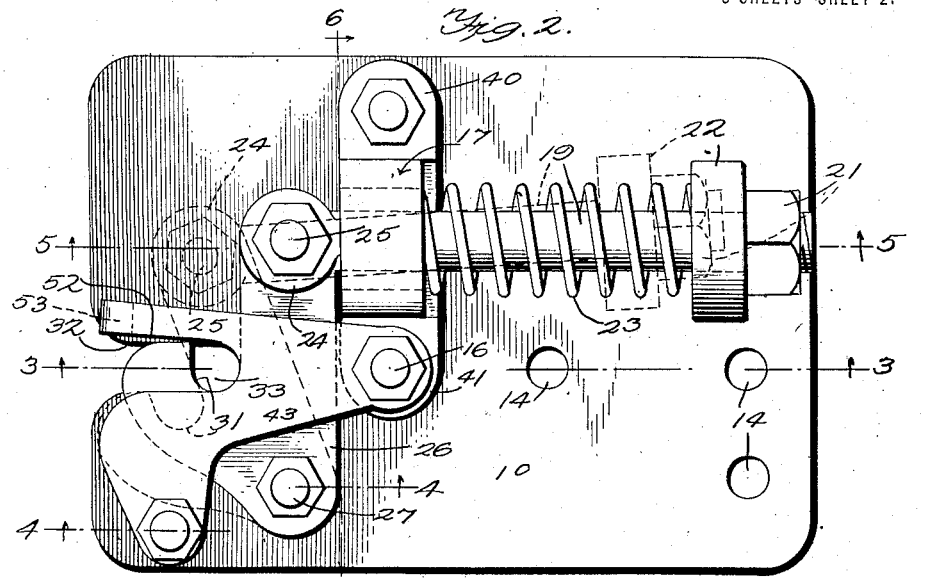
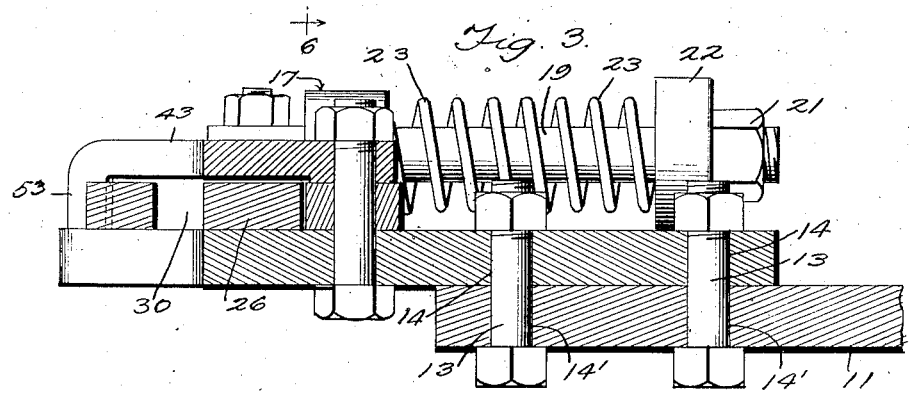
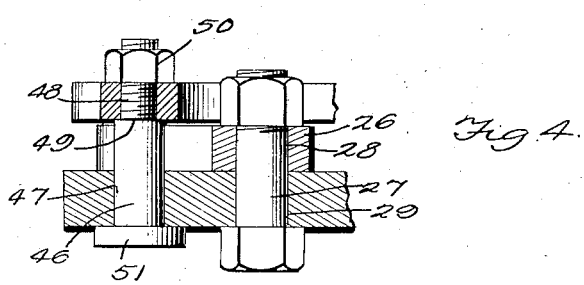
Inventor
Mike Holczer
By C. N. Farllen
Attorney M. HOLCZER.
TRACTOR HITCH.
APPLICATION FILED SEPT. 15, 1919.
1,327,617.
Patented Jan. 13, 1920.
3 SHEETS—SHEET 3.
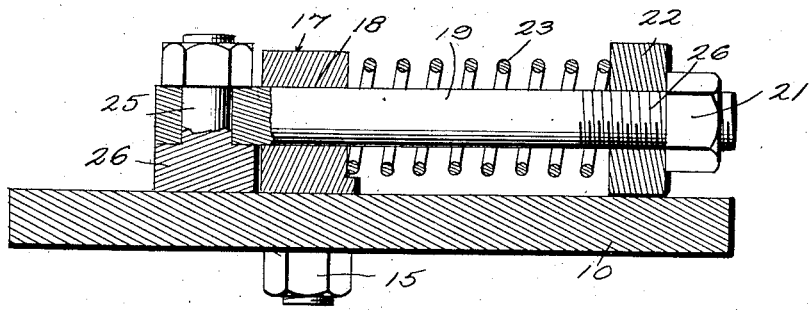
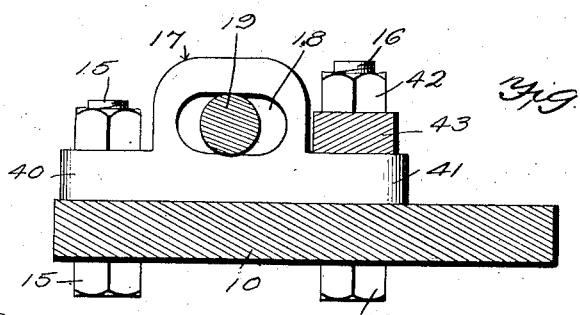
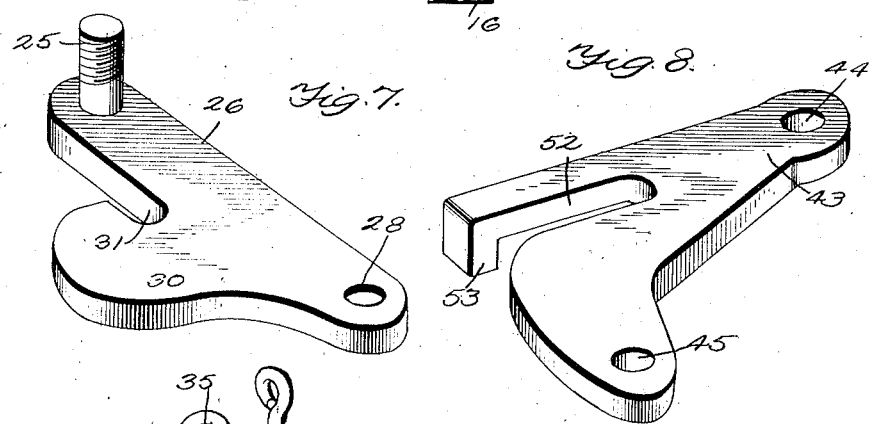
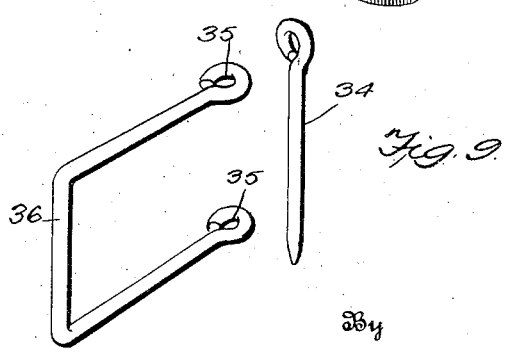
Inventor
Mike Holczer,
By
C. N. Parken
Attorney

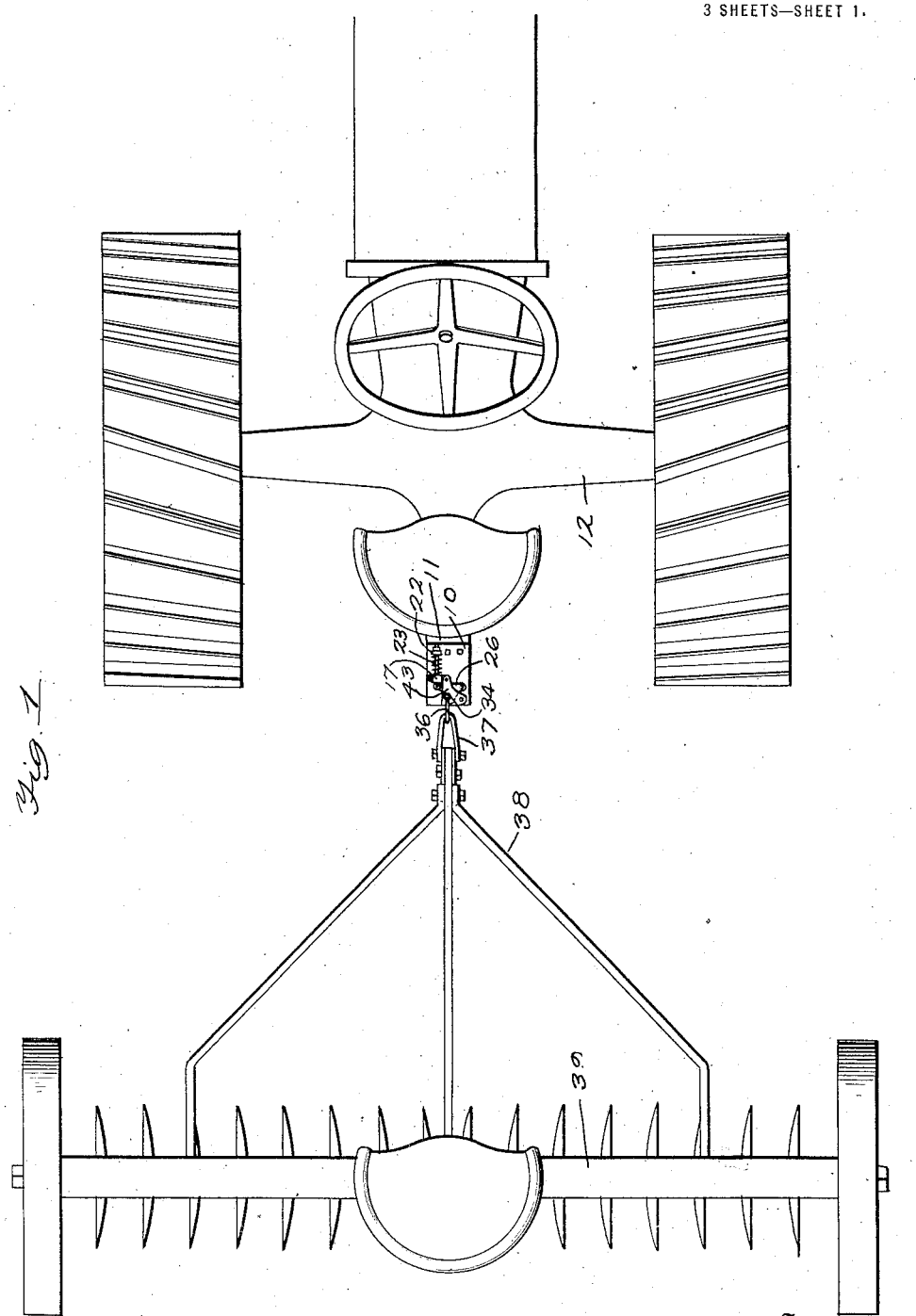

UNITED STATES PATENT OFFICE.

MIKE HOLCZER, OF NORFOLK, VIRGINIA.

TRACTOR-HITCH.

1,327,617.     Specification of Letters Patent.     Patented Jan. 13, 1920.

Application filed September 15, 1919. Serial No. 323,898.

*To all whom it may concern:*

Be it known that I, MIKE HOLCZER, a citizen of the United States, residing at 1246 Corprew Ave., city of Norfolk, in the county of Norfolk and State of Virginia, have invented certain new and useful Improvements in Tractor-Hitches, of which the following is a specification.

This invention relates to new and useful improvements in tractor hitches.

An important object of the invention is to provide a tractor hitch which will automatically release the article being drawn in event of undue strain being placed thereon.

A further object is to provide such an automatic release having means whereby the article being drawn may be readily recoupled after its release. I am aware that a number of hitches have been devised having means to uncouple the article drawn in event of undue strain, but I have found that in each instance it becomes necessary to spend some time in resetting the hitch before the article drawn may be recoupled to the tractor. This objection I have eliminated by devising a hitch which automatically resets itself preparatory to the recoupling of the drawn implement.

Other objects and advantages will be apparent throughout the course of the following discussion.

In the accompanying drawings wherein for the purpose of illustration, is shown a preferred embodiment of my invention and wherein like numerals designate like parts throughout, Figure 1 is a plan view showing a disk harrow coupled to a tractor by means of my hitch.

Fig. 2 is an enlarged plan view of my hitch.

Fig. 3 is a section taken on the line 3—3 of Fig. 2.

Fig. 4 is a section taken on the line 4—4 of Fig. 2.

Fig. 5 is a section taken on the line 5—5 of Fig. 2.

Fig. 6 is a section taken on the line 6—6 of Fig. 2.

Fig. 7 is a perspective of the coupling hook.

Fig. 8 is a perspective showing the covered plate, and

Fig. 9 is a combined perspective showing one means of attachment for the draft bar.

Referring now more particularly to the drawings, the numeral 10 indicates a suitable base adapted for attachment to the draw bar 11 of a tractor 12. In the present instance, this attachment is shown as comprising bolts 13 extending through openings 14 formed at the base plate 10 and openings 14' formed in the draw bar 11.

Secured to the base 10 by means of bolts 15 and 16 is a yoke 17, having a slot 18 formed therein. This slot 18 is adapted to receive a plunger 19. By examining Figs. 5 and 6 it will be obvious that the plunger 19 has side play in the slot 18 but no vertical play. The front end of the plunger 19 is provided with screw threads 20 adapted to receive nut 21. It will be noted that screw threads 20 are of considerable length and the nut 21 contacts a spring follower 22 to adjust the same. Extending intermediate the yoke 17 and spring follower 22 and about the plunger 19, is spring 23.

The rear end of the plunger 19 is provided with an eye 24 adapted to receive a bolt 25, formed on or secured to coupling hook 26. The coupling hook 26 is provided in its end remote from the bolt 25 with opening 28 adapted to receive a bolt 27 extending through an opening 29 formed in the base 10. The coupling hook is formed by enlarging one side of the plan 26 and forming a slot 31 therein. This slot extends longitudinally with relation to the plate, the end of the slot lying at a point midway between the two ends of the plate 26. A slot 32 is formed in the base 10, opening from the rear end thereof and extending inwardly of the plate so that its end alines with the slot 31 of the plate 26 to form a segregated aperture 33. This aperture is adapted to receive a coupling pin 34 which is in turn adapted to be received by the eyes 35 of the U-shaped coupling member 36. This U-shaped coupling member is adapted to receive the forward end 37 of the draft bar 38 of the drawn implement 39.

The yoke 17 is provided with ears 40 and 41, having apertures adapted to receive the bolts 15 and 16 respectively. Seated intermediate the nut 42 of the bolt 16 and the ear 41 of the yoke 17, is a cover plate 43 having an aperture 44 through which the bolt 16 extends. The plate 43 is approximately triangular in shape and is provided adjacent one of the angles with a second opening 45. A bolt 46 is provided extending through opening 47 in the base 10. At the point where the bolt 46 enters the opening 45 of the plate 43, it is reduced as at 48 thereby forming a shoulder 49 upon which the plate 43 is seated, the plate being held in position by a nut 50. The lower end of the bolt 46 is provided with an enlarged head 51 to prevent vertical displacement thereof. Plate 43 is provided with the slot 52, corresponding in size and arrangement to the slot 32 formed in the base 10. The end of the plate 43 adjacent slot 52 is turned down as at 53 to hold the plate 43 in spaced relation to the base 10. It will be seen that vertical displacement of the hook plate 26 is prevented by cover plate 43.

The operation of my device is as follows:

When the load is being drawn and remains under normal conditions, the plate 26 remains in the position shown in the solid lines in Fig. 2. If, however, the cultivator or the like being drawn by the tractor contacts something offering heavy resistance, the added pull moves the plate 26 to the position shown by the dotted lines in Fig. 2, thereby releasing the pin 34 and allowing the implement 39 to come to a stop. The plate 26 immediately resumes the position shown by the solid lines in Fig. 2. Then to recouple the harrow and tractor, remove the pin 34 from the eyes 35 and replace it through the opening 33.

As many changes are possible in the shape, size, and arrangement of the parts herein shown, I do not limit myself to the specific structure described herein, but may make any such changes without in any way departing from the spirit of the invention or the scope of the subjoined claims.

1. In a tractor hitch the combination with a coupling member embodying a removable coupling pin of a base plate adapted for attachment to the tractor having a slot formed therein extending through one side thereof, a hook plate pivotally mounted upon said base and normally coacting with said slot to form an aperture to receive said pin, said hook plate being adapted under certain conditions to shift to allow said coupling pin to be withdrawn from said plate through said slot, and means adapted to hold said hook plate in normal position and return said hook plate to normal position after it has been shifted to release said pin.

2. In a tractor hitch the combination with a coupling member embodying a removable coupling pin of a base plate adapted for attachment to the tractor having a slot formed therein extending through one side thereof, a hook plate pivotally mounted upon said base and normally coacting with said slot to form an aperture to receive said pin, said hook plate being adapted under certain conditions to shift to allow said coupling pin to be withdrawn from said plate through said slot, and means adapted to hold said hook plate in normal position and return said hook plate to normal position after it has been shifted to release said pin, comprising a yoke secured to said base a plunger extending through said yoke and pivotally connected at one end with said hook plate, a follower adjustably mounted upon said plunger adjacent the other end thereof and a spring disposed intermediate said follower and said yoke.

3. In a tractor hitch a base plate adapted for attachment to the tractor slot formed in said plate and extending through one side thereof, a hook plate pivoted upon said base plate and adapted to normally segregate a portion of said slot, a coupling member adapted for insertion in said slot, and resilient means for retaining said plate in normal position, comprising a yoke secured to said base a plunger extending through said yoke and pivotally connected at one end with said hook plate, a follower adjustably mounted upon said plunger adjacent the other end thereof and a spring disposed intermediate said follower and said yoke.

In testimony whereof I affix my signature in presence of two witnesses.

MIKE HOLCZER.

Witnesses:
 EDWARD BROCKENBROUGH,
 GRACE L. DOWDING.